United States Patent
Yoshinari et al.

(10) Patent No.: US 9,496,536 B2
(45) Date of Patent: Nov. 15, 2016

(54) BACKPACK-TYPE POWER SUPPLY

(71) Applicant: Hitachi Koki Co., Ltd., Tokyo (JP)

(72) Inventors: Takuya Yoshinari, Hitachinaka (JP); Haruhisa Fujisawa, Hitachinaka (JP); Yuji Kishima, Hitachinaka (JP); Naoto Wakatabe, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 93 days.

(21) Appl. No.: 14/420,304

(22) PCT Filed: Aug. 9, 2013

(86) PCT No.: PCT/JP2013/004816
§ 371 (c)(1),
(2) Date: Feb. 6, 2015

(87) PCT Pub. No.: WO2014/030318
PCT Pub. Date: Feb. 27, 2014

(65) Prior Publication Data
US 2015/0255773 A1    Sep. 10, 2015

(30) Foreign Application Priority Data

Aug. 20, 2012 (JP) ................................ 2012-181943
Dec. 28, 2012 (JP) ................................ 2012-288242

(51) Int. Cl.
*H01M 2/20* (2006.01)
*A45F 3/00* (2006.01)
(Continued)

(52) U.S. Cl.
CPC ................ *H01M 2/204* (2013.01); *A45F 3/00* (2013.01); *A45F 3/04* (2013.01); *A45F 3/08* (2013.01);
(Continued)

(58) Field of Classification Search
CPC ............ H01M 2/204; H01M 10/617; H01M 10/653; A45F 3/00
See application file for complete search history.

(56) References Cited

U.S. PATENT DOCUMENTS 6,087,815 A    7/2000    Pfeifer et al.
7,663,339 B2   2/2010    Kimura
(Continued)

FOREIGN PATENT DOCUMENTS

CN    101051760 A    10/2007
CN    101997099 A    3/2011
(Continued)

OTHER PUBLICATIONS

International Search Report for application PCT/JP2013/004816 (Nov. 11, 2013).
(Continued)

*Primary Examiner* — Stewart Fraser
(74) *Attorney, Agent, or Firm* — Kilpatrick Townsend & Stockton LLP

(57) ABSTRACT

A backpack-type power supply includes: a plurality of cell units (52) each configured of a plurality of secondary battery cell (51); a case (12) configured to accommodate the cell units and having first and second contacts; and a harness (13) attached to the case, characterized by including; first connecting means (581, 571) for electrically connecting the first contact and a positive terminal of each cell unit to form a first electrical path therebetween; and second connecting means (572, 582) for electrically connecting the second contact and a negative terminal of each cell unit to form a second electrical path therebetween, each first electrical path and each second electrical path forming a total electrical path having a total resistance for each cell unit, the total resistance of each total electrical path being adjusted such that heat distribution is substantially uniform over the plurality of cell units in the case.

18 Claims, 8 Drawing Sheets

(51) Int. Cl.

| | | |
|---|---|---|
| *A45F 3/04* | (2006.01) | |
| *A45F 3/08* | (2006.01) | |
| *A45F 3/10* | (2006.01) | |
| *B25F 5/00* | (2006.01) | |
| *H01M 10/617* | (2014.01) | |
| *H01M 10/653* | (2014.01) | |
| *H02H 7/18* | (2006.01) | |
| *A45F 3/14* | (2006.01) | |
| *H01M 10/6551* | (2014.01) | |

(52) U.S. Cl.
CPC . *A45F 3/10* (2013.01); *B25F 5/00* (2013.01); *H01M 10/617* (2015.04); *H01M 10/653* (2015.04); *H02H 7/18* (2013.01); *A45F 2003/003* (2013.01); *A45F 2003/146* (2013.01); *H01M 10/6551* (2015.04); *H01M 2220/30* (2013.01)

(56) References Cited

U.S. PATENT DOCUMENTS

| | | | |
|---|---|---|---|
| 8,330,416 | B2 | 12/2012 | Goma |
| 8,410,756 | B2 | 4/2013 | Sakakibara et al. |
| 8,945,746 | B2 | 2/2015 | Kwag et al. |
| 2007/0236173 | A1 | 10/2007 | Kimura |
| 2010/0102627 | A1 | 4/2010 | Abe |
| 2010/0320969 | A1* | 12/2010 | Sakakibara ......... H01M 2/1022 320/118 |
| 2011/0039142 | A1 | 2/2011 | Kwag et al. |
| 2011/0177373 | A1* | 7/2011 | Pellenc ................ H01M 2/105 429/120 |
| 2012/0003507 | A1 | 1/2012 | Krieg |
| 2012/0164508 | A1 | 6/2012 | Houchin-Miller et al. |
| 2012/0187172 | A1 | 7/2012 | Heaword |
| 2012/0219845 | A1 | 8/2012 | Chiba |
| 2013/0164600 | A1* | 6/2013 | Rosskamp ............ H01M 2/202 429/159 |
| 2013/0193768 | A1 | 8/2013 | Iwasaki et al. |
| 2014/0011061 | A1* | 1/2014 | Yoshinari ................ B25F 5/00 429/91 |
| 2014/0117762 | A1 | 5/2014 | Yamauchi et al. |
| 2015/0188332 | A1* | 7/2015 | Nakano ................ H02J 7/0004 320/112 |
| 2015/0194647 | A1* | 7/2015 | Yoshinari ................ B25F 5/00 429/7 |

FOREIGN PATENT DOCUMENTS

| | | |
|---|---|---|
| CN | 202159716 U | 3/2012 |
| DE | 202010012151 U1 | 11/2010 |
| EP | 0952620 A1 | 10/1999 |
| EP | 1030388 A1 | 8/2000 |
| JP | 07-3983 U | 1/1995 |
| JP | H10-137035 A | 5/1998 |
| JP | 2000-058016 A | 2/2000 |
| JP | 2000-149900 A | 5/2000 |
| JP | 2002-224631 A | 8/2002 |
| JP | 2002-358941 A | 12/2002 |
| JP | 2004-031255 A | 1/2004 |
| JP | 2007-294175 A | 11/2007 |
| JP | 2008-080878 A | 4/2008 |
| JP | 2008-109841 A | 5/2008 |
| JP | 2010-104178 A | 5/2010 |
| JP | 2011-055680 A | 3/2011 |
| JP | 2011-258387 A | 12/2011 |
| JP | 2012-181941 A | 9/2012 |
| WO | WO2009/069404 A1 | 6/2009 |
| WO | WO2012/050032 A1 | 4/2012 |
| WO | WO2012/176261 A1 | 12/2012 |

OTHER PUBLICATIONS

International Report on Patentability for application PCT/JP2013/004816 (Mar. 5, 2015), 9 pages.

Japanese Patent Application No. 2012-181943, Notification of Reasons for Refusal, mailed Dec. 3, 2015, with English translation.

Chinese Patent Application No. 2013800434343.3, The Notification of the First Office Action, mailed Nov. 3, 2015, with English translation.

Japan Patent Office office actions JPO patent application JP2012-288242 (Jun. 16, 2016).

* cited by examiner

BACKPACK-TYPE POWER SUPPLY

TECHNICAL FIELD

The invention relates to a backpack-type power supply housing rechargeable batteries for supplying power to a power tool.

BACKGROUND ART

Motor-driven power tools and the like have conventionally been connected to a commercial AC power source, a DC constant-voltage power source, and the like, but a growing number of power tools are now equipped with secondary batteries. Power tools employing secondary batteries are also referred to as cordless power tools. As these power tools continue to expand in type and application, a demand for greater battery capacity increases. While a battery pack for powering these power tools has traditionally been mounted directly in a body of the tool, a waist-belt-type power supply has also been proposed. This power supply accommodates rechargeable batteries in a waist belt that can be worn about the user's waist (for example, see Japanese Utility Model Application Publication No. H07-3983).

SUMMARY OF INVENTION

Technical Problem

However, the waist-belt-type power supply has a limitation in the number of rechargeable batteries it can accommodate. There is a need for a portable power supply for power tools and the like that has a larger capacity than a waist-belt-type power supply and that is commercially viable. One such portable power supply is a backpack-type power supply. A backpack or similar type power supply can possess a larger battery capacity than a waist-belt-type power supply because the backpack housing can accommodate a larger number of secondary cells (rechargeable lithium-ion batteries, for example) arranged in adjacent rows (battery units). Further, secondary cells with a low internal resistance must be used in technical fields that require an output of a large electrical current in order to reduce the amount of heat generated by such internal resistance.

With the battery cell arrangement described above for a large-capacity power supply that is carried on the user's back, the temperature of each battery unit may be more irregular than in conventional battery packs having a smaller capacity. Further, the amount of heat generated in the rechargeable batteries of a large-capacity backpack-type power supply may be larger because the power supply outputs a larger current and can be used continuously over a longer period of time. Accordingly, any slight difference in the properties of individual battery units constituting the high-capacity power supply tends to be magnified the longer the power supply is used.

Further, secondary batteries of the type used in this technical field tend to heat up as they are charging or discharging. Generally, chemical conversion of active material in rechargeable batteries progresses as temperature increases, increasing the output current. Temperature and output current have a positive correlation in secondary cells that increase in temperature while discharging. Hence, if a temperature difference between secondary cells exists, there is potential for this difference to grow.

Such irregularity in temperature among secondary cells will lead to an irregular service life among the battery units. Consequently, the battery unit possessing secondary cells that generate the most heat and have the shortest life span limits the overall storage capacity of a large-capacity power supply.

Hence, irregular temperatures among secondary cells constituting a high-capacity power supply become a more serious problem as the number of cells in the power supply or the capacity of the power supply increases. Sufficient measures must be taken in order to achieve a viable large-capacity portable power supply for supplying electricity to power tools.

Further, since a large-capacity power supply has a larger number of battery cells, more time and effort is necessary for inspection and maintenance.

Solution to Problem

In view of the foregoing, it is an object of the present invention to provide a backpack-type power supply capable of uniformly distributing temperature among its secondary cells and capable of facilitating inspections and maintenance on those secondary cells.

In order to attain the above and other objects, the invention provides a backpack-type power supply including: a plurality of cell units, a case and a harness. Each of the plurality of cell units is configured of a plurality of secondary battery cells connected in series. The case is configured to accommodate the plurality of cell units therein, the case having a first contact and a second contact each electrically connected to each of the plurality of cell units. The harness is attached to the case and adapted to be worn on a user's back. The backpack-type power supply further includes first and second connecting means. The first connecting means serves to electrically connect the first contact and a positive terminal of each cell unit to form a first electrical path therebetween, each first electrical path having a first resistance. The second connecting means serves to electrically connect the second contact and a negative terminal of each cell unit to form a second electrical path therebetween, each second electrical path having a second resistance, each first electrical path and each second electrical path forming a total electrical path for each of the cell units, the total electrical path having a total resistance, the total resistance of each total electrical path being adjusted such that heat distribution is substantially uniform over the plurality of cell units in the case.

It is preferable that the total resistance of each total electrical path is substantially equal to each other over the plurality of cell units.

This construction can equalize magnitudes of electric current outputted from each cell unit, thereby achieving more uniform heat distribution among cell units. Therefore, a more uniform distribution of temperature can be achieved among the secondary battery cells, and the performance of the backpack-type power supply can be maintained over a longer period of time.

Further, even when only some of the secondary battery cells suffer from degradation, only the cell unit possessing the degraded secondary battery cells need be replaced, rather than all of the secondary battery cells in the backpack-type power supply. Replacing secondary battery cells by cell units in this way facilitates maintenance and inspection of the backpack-type power supply and reduces costs required for re-placements.

It is preferable that the first resistance is substantially equal to each other among the plurality of cell units, and the second resistance is substantially equal to each other among the plurality of cell units.

It is also preferable that: the first connecting means includes a plurality of first electrically conductive plates and a plurality of first lead wires configured to connect each of the plurality of cell units in parallel, the first electrically conductive plates having a shape identical to one another and the first lead wires having a length equal to each other; and the second means includes a plurality of second electrically conductive plates and a plurality of second lead wires configured to connect each of the plurality of cell units in parallel, the second electrically conductive plates having a shape identical to one another and the second lead wires having a length equal to each other.

Through this simple construction, cell units can be interconnected via the first and second connecting means having substantially the same resistance values as each other. This construction thus ensures that the magnitudes of electric current outputted from each cell unit is equalized, thereby achieving a uniform amount of heat generation among the cell units.

It is preferable that the backpack-type power supply further includes: a circuit board configured to monitor overdischarging and overcharging in the plurality of cell units; and an output line connectable to a power tool and configured to supply power from the cell units to the connected power tool, the circuit board serving as the first contact of the case and the output line serving as the second contact of the case.

It is also preferable that: the circuit board further includes a switching element configured to perform switching supply and shutdown of power from the cell units, the circuit board being disposed adjacent to one of the plurality of cell units; and the backpack-type power supply further includes a heat insulating member positioned between the switching element and the one cell unit to prevent heat from transmitting to the one cell unit.

This structure can prevent heat generated from the switching element from transmitting to the cell unit, thereby leading to more uniform heat distribution among the cell units.

It is also preferable that the plurality of cell units includes a first cell unit and a second cell unit, the circuit board being disposed between the first cell unit and the second cell unit.

It is also preferable that the circuit board includes two circuit boards, each of the two circuit boards being disposed to surround the plurality of cell units.

With this construction, the heat radiating effect of the circuit boards can be used to distribute the temperature more uniformly among the secondary battery cells.

It is preferable that the circuit board includes a plurality of protective circuit boards each disposed for each of the plurality of cell units.

With this structure, the secondary battery cells can be monitored more carefully, leading to reduction (or prevention) in degradation of the secondary battery cells and facilitating management of the secondary battery cells. This construction also enhances accuracy in maintenance of the backpack-type power supply.

It is preferable that each of the first electrical paths and each of the second electrical paths include at least one of a switching element and a fuse for shutting down the corresponding electrical path.

It is also preferable that: the plurality of cell units includes a first cell unit and a second cell unit, the first cell unit being disposed upward of the second cell unit; and the total resistance of the total electrical path of the first cell unit is larger than the total resistance of the total electrical path of the second cell unit.

It is also preferable that: the plurality of cell units includes a first cell unit, a second cell unit and a third cell unit juxtaposed in a first direction, the second cell unit being disposed between the first and third cell units in the first direction; and the total resistance of the total electrical path of the second cell unit is larger than the total resistance of the total electrical path of the first cell unit and larger than the total resistance of the total electrical path of the third cell unit.

With these constructions, the resistance value for the cell unit that generates higher heat can be set relatively larger so that the magnitude of electric current outputted from the high-temperatured cell unit can be reduced, thereby achieving more uniform heat distribution among cell units.

It is preferable that the backpack-type power supply further includes a thermal diffusion member configured to disperse heat among the cell units, the thermal diffusion member being disposed to cover at least a portion of the cell units.

It is preferable that the thermal diffusion member is a thermally conductive sheet.

This construction can realize uniform distribution of heat among the cell units.

It is preferable that the case has a heat conductive portion that is made of a material having a thermal conductivity higher than a thermal conductivity of the harness, heat generated from the plurality of cell units being configured to be transferred to the heat conductive portion.

With this construction, heat generated from the cell units can be released to the heat conductive portion of the case, thereby contributing to uniform distribution of heat among the cell units.

It is preferable that the case includes a first section configured to oppose the user's back and a second section coupled to the first section, the plurality of cell units being accommodated in one of the first section and the second section.

It is also preferable that the first section is provided with a plurality of first connecting plates electrically connectable to the plurality of cell units and the second section is provided with a plurality of second connecting plates electrically connectable to the plurality of cell units, the plurality of cell units being electrically connected to one another via the first connecting plates and the second connecting plates when the first section and the second section are coupled to each other.

It is preferable that the plurality of cell units is electrically connected in parallel via the first connecting plates and the second connecting plates when the first section and the second section are coupled to each other.

This construction (dividing the plurality of connection plates among the two sections of the case) rather than providing all connecting plates in one section eliminates time and effort required to remove such connecting plates at the manufacturing stage or when replacing the cell units, thereby greatly simplifying these tasks. Further, since the cell units are electrically disconnected from one other when the first section and second section are not coupled to each other, even when an accidental short-circuit occurs in the secondary battery cells while the case is open for repair work or the like, the short-circuit only affects the cell unit including the short-circuited secondary battery cells, but has little effect on the other cell units.

Advantageous Effects of Invention

The backpack-type power supply of the present invention functions to supply power to power tools and can reduce biases in temperature among multiple secondary battery cells provided in the power supply, thereby sustaining the performance of the backpack-type power supply over a longer period of time. Further, replacement of the battery cells (cell unit) can be performed easily, and thus maintenance of the backpack-type power supply can be facilitated.

DESCRIPTION OF EMBODIMENT

Next, a backpack-type power supply 1 according to a first embodiment of the invention will be described while referring to FIGS. 1 through 5.

Figure 1:
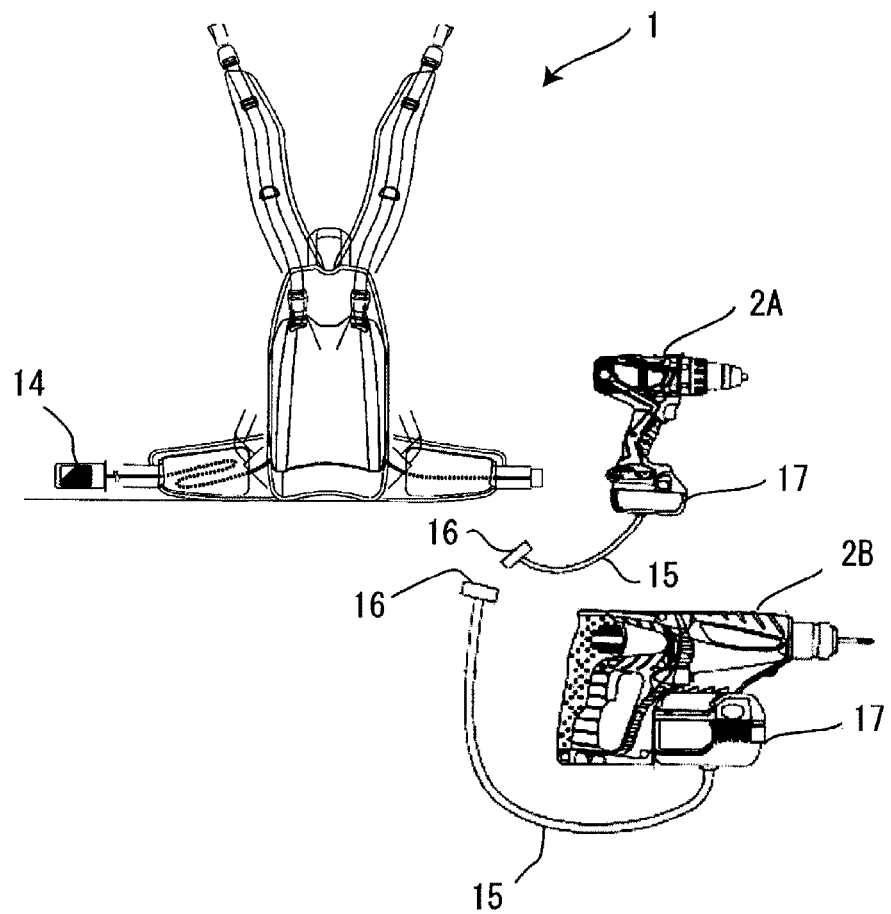
FIG. 1 is an explanation diagram explaining a usage of a backpack-type power supply according to a first embodiment of the present invention.

The backpack-type power supply 1 serves to supply electricity to a power tool connected to the backpack-type power supply 1 via a power cable 15. The backpack-type power supply 1 can supply power to various small tools designed for farm work, yard work, street cleaning, and other outdoor applications, such as chainsaws, leaf blowers, string trimmers, and lawn mowers. FIG. 1 shows two examples of power tools 2A and 2B having different rated voltages that are used for drilling or screw tightening. The power tool 2A or 2B is connected to the backpack-type power supply 1 with the power cable 15. The power cable 15 is connected to the bottom of the backpack-type power supply 1 with a connector 16 and to the power tool 2A or 2B through an adapter 17.

Figure 2:
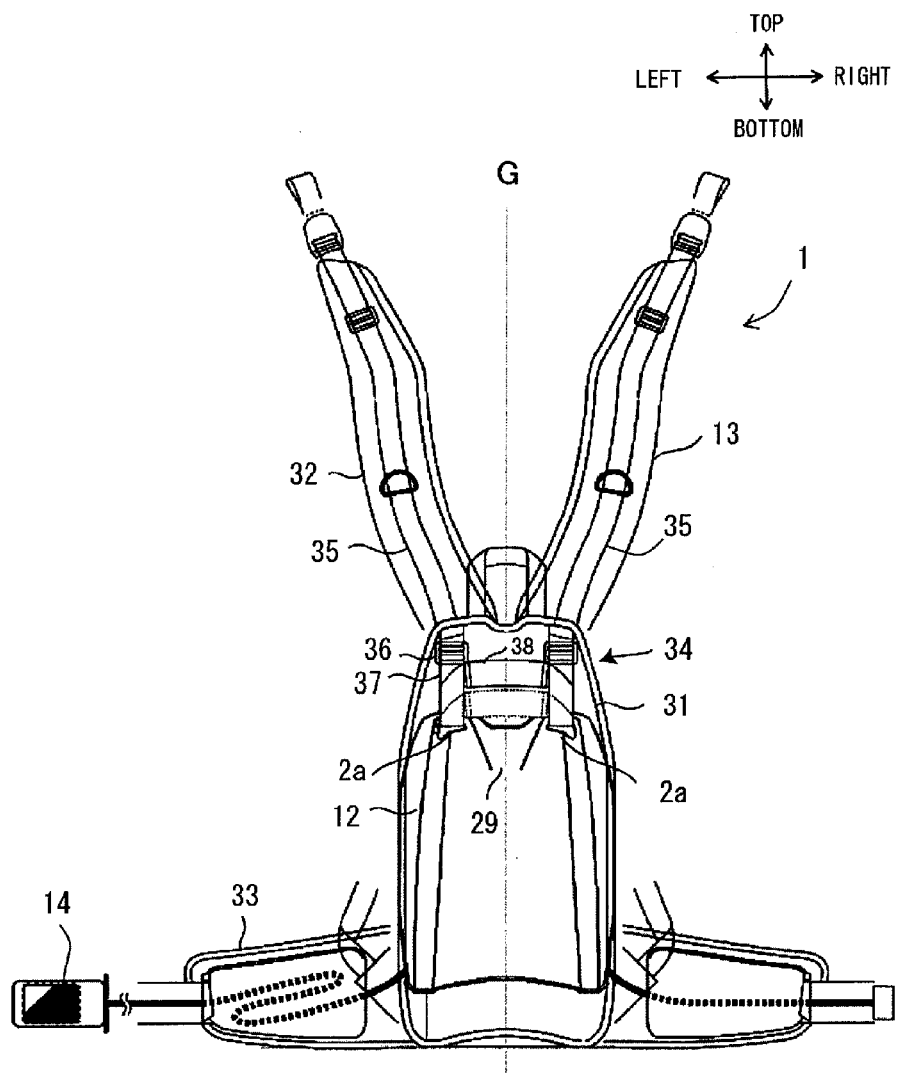
FIG. 2 is a front view of the backpack-type power supply according to the first embodiment, the backpack-type power supply having a case.

Referring to FIG. 2, the backpack-type power supply 1 includes a case 12, and a harness 13 for supporting the case 12 on a user's back. The case 12 accommodates a plurality of battery cells 51, as will be described later. An operating switch 14 for controlling power supply to the power tools 2A or 2B is also connected to the case 12.

The harness 13 includes a padded part 31, a pair of shoulder straps 32, and a pair of waist belts 33. The padded part 31 is formed of a non-rigid member having substantially the same size as the case 12 and is disposed so as to be interposed between the case 12 and the user's back when the backpack-type power supply 1 is worn.

The shoulder straps 32 extend from top to bottom and are connected to top and bottom portions of the padded part 31 on both right and left sides thereof. The case 12 can be carried on one's back by inserting his arms and shoulders into the loops formed by the shoulder straps 32.

The waist belts 33 extend in a generally horizontal direction from each side of the padded part 31 on the bottom portion thereof. Distal ends of the waist belts 33 are configured to engage with each other. By engaging these ends, the case 12 can be fitted to the user's body. The operating switch 14 is provided on the distal end of one of the waist belts 33.

An auxiliary belt may be provided above the waist belts 33 to connect the right and left shoulder straps 32 in the generally horizontal direction. The addition of this auxiliary belt reduces rubbing between the case 12 and the user's body as the user is working.

The padded part 31 to which the shoulder straps 32 and waist belts 33 are connected is fixed to the case 12 by screws or other fastening members. The padded part 31 is fixed by these fastening members to a plurality of fixing parts 21b and 22b (see FIGS. 3, 7 and 8) respectively provided in a first section 21 and second section 22 of the case 12, described later.

The harness 13 is also provided with a top strapping system 34 that extends from the shoulder straps 32 through the padded part 31 to the case 12. The top strapping system 34 includes a pair of top straps 35, a pair of buckles 36, a pair of straps 37, and a handle 38.

The top straps 35 are provided on and extend along the shoulder straps 32. The top straps 35 have one end portions connected to the top portion of the padded part 31 on both left and right sides thereof. The buckles 36 are respectively connected to these end portions of the top straps 35. The straps 37 are formed of a belt-like material and pass through respective through-holes 2a formed in the case 12. Both ends of each strap 37 are connected to the corresponding buckle 36.

The buckles 36 are configured to allow the user to adjust positions at which the buckles 36 are connected with the corresponding straps 37. By adjusting these connection positions, the user can adjust the lengths of the straps 37 extending from the corresponding buckles 36 to the corresponding through-holes 2a, i.e., the gap between the user's back (the padded part 31) and the case 12. Adjusting the lengths of the straps 37 to adjust the gap between the user's back and the case 12 enables the user to efficiently distribute the weight of the case 12 on the shoulder straps 32, thereby greatly reducing user fatigue.

The handle 38 is a strap-like member and is attached to the straps 37. More specifically, the handle 38 has both ends attached to outer surfaces of the straps 37 respectively, the outer surface being opposite to an inner surface of each strap 37 facing the padded part 31. The handle 38 is in this way connected to the case 12 via the straps 37. The handle 38 has a greater left-right dimension than that of a grip recess 29 formed on the case 12.

With this construction, adjusting the connection positions between the buckles 36 and the straps 37 not only allows the user to adjust the gap between the user's back (the padded part 31) and the case 12 as described above, but also allows the user to adjust the distance between the handle 38 and the case 12. As a result, the handle 38 can be set to a length that is easy to grip, even when wearing working gloves, for example.

This construction also helps the user carry the backpack-type power supply 1 by the handle 38 when moving only a short distance that would not necessitate putting on the backpack-type power supply 1, for example. Further, by connecting the handle 38 to the case 12, which is the heaviest component of the backpack-type power supply 1, the backpack-type power supply 1 remains balanced when lifted and is therefore easier to carry. The backpack-type power supply 1 remains particularly well-balanced when lifted if the harness 13 is provided along a line of gravity G shown in FIG. 2.

As described above, the case 12 is connected to the harness 13 (padded part 31) through the top strapping system 34. Hence, a load is not applied to the junction between the case 12 and harness 13 when the user carries the backpack-type power supply 1 by the handle 38. Further, since the case 12 and harness 13 are connected via the handle 38, as well as the fixing parts 21a and 22a formed in the case 12, the case 12 and harness 13 are unlikely to become separated unexpectedly.

Further, providing the handle 38 on the top strapping system 34 (straps 37) keeps the handle 38 from becoming too expensive and its structure from becoming too complex.

Further, the top strapping system 34 allows the user to freely adjust the distance between the case 12 and harness 13. The top strapping system 34 can also permit small objects, such as a plastic bottle, gloves, power tool accessories, adapters, or the like to be held between the case 12 and harness 13. Accordingly, this top strapping system 34 can improve the comfort and convenience of wearing the backpack-type power supply 1.

The handle 38 is provided on the outer surfaces of the straps 37 opposite to the inner surfaces of the straps 37 connected to the padded part 31 of the harness 13. In this way, the handle 38 can be connected to the case 12 and harness 13 through a simple structure.

When adjusting the lengths of the straps 37 with the intention of adjusting the gap between the user's back and the case 12, the user may decide to shorten their lengths. With the simple structure of passing the straps 37 through the through-holes 2a, shortening the lengths of the straps 37 brings the handle 38 closer to or into contact with the case 12. At this time, it may be difficult for the user to grip the handle 38.

However, in this first embodiment, the grip recess 29 having a narrower left-right dimension than the handle 38 is formed in the area at which the handle 38 is expected to contact the case 12. The grip recess 29 provides a space between the case 12 and the handle 38 even when the handle 38 is in contact with the case 12. Thus, even when the handle 38 is in contact with the case 12, the user can easily grip the handle 38 by inserting fingers into the space formed by the grip recess 29.

Next, detailed construction of the case 12 will be described.

The case 12 has a box-like shape and should be formed of a hard casing having sufficient strength for use in operations with a power tool, and at least a portion of the case 12 defining its internal space should be formed of a material that is electrically non-conductive. Some preferred examples of such non-conductive materials are a metal that has been surface treated with an insulating coating or the like, and an electrically non-conductive resin. The case 12 may have an exterior formed of a soft material, such as a fibrous fabric or the like, provided that an internal structure holding the secondary battery cells 51 and the like is configured of a hard material.

Figure 8:
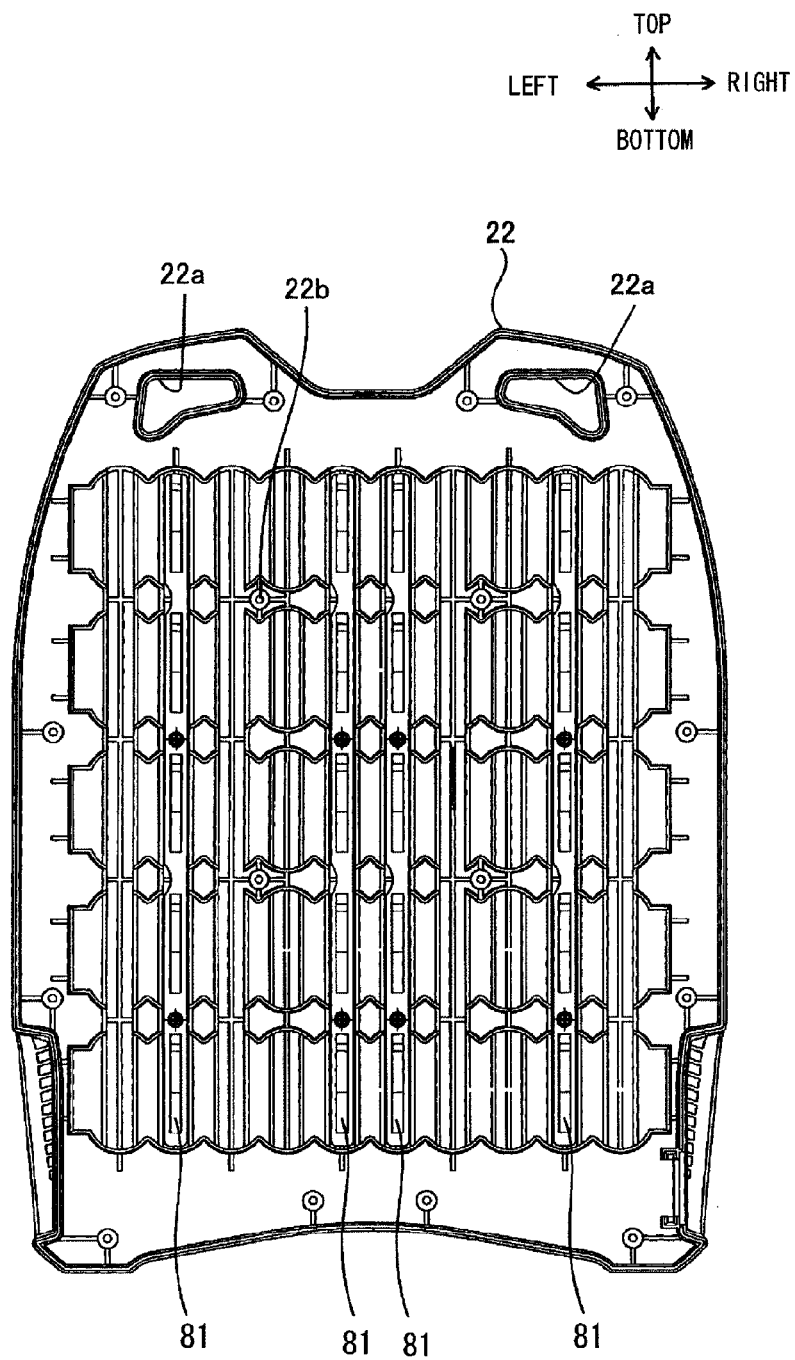
FIG. 8 is a cross-sectional plan view showing an internal configuration of the second section of the case of the backpack-type power supply of FIG. 7.

The case 12 includes a first section 21 constituting one side (inner side) of the case 12 that is nearest the user's back when the backpack-type power supply 1 is worn (see FIG. 3), and a second section 22 (outer side) that is placed against and fitted into the first section 21 to define a space therein (refer to FIG. 8). A pair of through holes 21a is formed in a top portion of the first section 21, and a pair of through-holes 22a is formed in a top portion of the second section 22. These through-holes 21a, 22a are respectively aligned when the first section 21 and second section 22 are assembled and, together, constitute the pair of through-holes 2a through which the straps 37 are inserted.

The case 12 accommodates a total of eighty lithium-ion secondary battery cells (hereinafter simply "battery cells") 51. More specifically, referring to FIG. 3, four cell units 52 (cell units 52A-52D in order from top to bottom) are accommodated in the first section 21 of the case 12. Each cell unit 52 includes a total of twenty battery cells 51 arranged in two rows of ten battery cells 51 connected in series in a left-right direction, the two rows being juxtaposed vertically. The cell units 52 themselves are also elongated in the left-right direction and juxtaposed vertically. Each of the battery cells 51 is a lithium-ion cell having a rated voltage of 3.6 volts. The total of eighty battery cells 51 can therefore provide a power supply with an overall rating of 36 volts.

Incidentally, the number of cells 51 and their connection configuration in each cell unit 52 is not restricted to the example given in the present embodiment.

A main power switch 54 is provided on a lower side surface of the first section 21 of the case 12. The main power switch 54 lies on power supply paths leading from the cell units 52 to the power tool 2A or 2B and is capable of halting power being outputted to the power tool 2A or 2B.

A circuit board 60 is mounted on top of the cell unit 52A in the first embodiment.

The circuit board 60 is provided with an overall control circuit of the backpack-type power supply 1, and a circuit for monitoring overdischarging and overcharging in the cell units 52 to control charging and discharging. The circuit board 60 has an upper surface on which field-effect transistors (FETs) 61A and 61B are disposed. The FETs 61A and 61B are used in the control circuit or in the circuit for monitoring overdischarging and overcharging. In the first embodiment, the FETs 61A and 61B function as a shutdown element for halting discharging and charging operations when any of the cell units 52 overdischarges or overcharges.

An insulating sheet 65 is disposed on a bottom surface of the circuit board 60 (i.e., on the surface of the circuit board 60 confronting the cell unit 52A) in an area corresponding to the FETs 61A and 61B. The insulating sheet 65 has a size at least larger than the FETs 61A and 61B so as to cover the FETs 61A and 61B in front-rear and left-right directions in a region adjacent to the battery cells 51 (the cell unit 52A).

While only two FETs 61A and 61B are provided on the circuit board 60 in the present example, the number of FETs is not necessarily limited to two. In any case, the insulating sheet 65 provided on the circuit board 60 should be large enough in the front-rear and left-right directions to ensure sufficient thermal spacing between the FETs 61A, 61B and battery cells 51. Further, while a single insulating sheet 65 is provided to cover both FETs 61A and 61B in the example of FIG. 3, one insulating sheet 65 may be provided for each FET. Note that the term "insulating" in the present invention is intended to mean "sufficiently reducing heat transfer."

Any material may be inserted between the FETs 61A, 61B and battery cells 51 to prevent heat generated by the FETs 61A, 61B from being transferred to the battery cells 51. Examples of good materials for the insulating sheet 65 are resinous or porous materials with low thermal conductivity.

Each cell unit 52 has a plurality of metal plates 56 (56A and 56B) provided along front and rear ends of the battery cells 51. These metal plates 56 connect the two rows of battery cells 51 juxtaposed vertically in series in each cell unit 52, with each row having ten battery cells 51 connected in series in the left-right direction. More specifically, referring to FIG. 7, the plurality of metal plates 56A each generally shaped like a hollow square is provided along the front and rear ends of the battery cells 51 in a staggered manner. The metal plates 56A form battery tabs (electrodes) that connect two rows of battery cells 51 in each cell unit 52 so that each row of the battery cells 51 is aligned in the left-right direction and the two rows are connected vertically in parallel. A plurality of metal plates 56B each having a generally rectilinear shape is also provided on each of the left and right ends of the cell units 52 that are not covered with the plurality of metal plates 56A.

Figure 3:
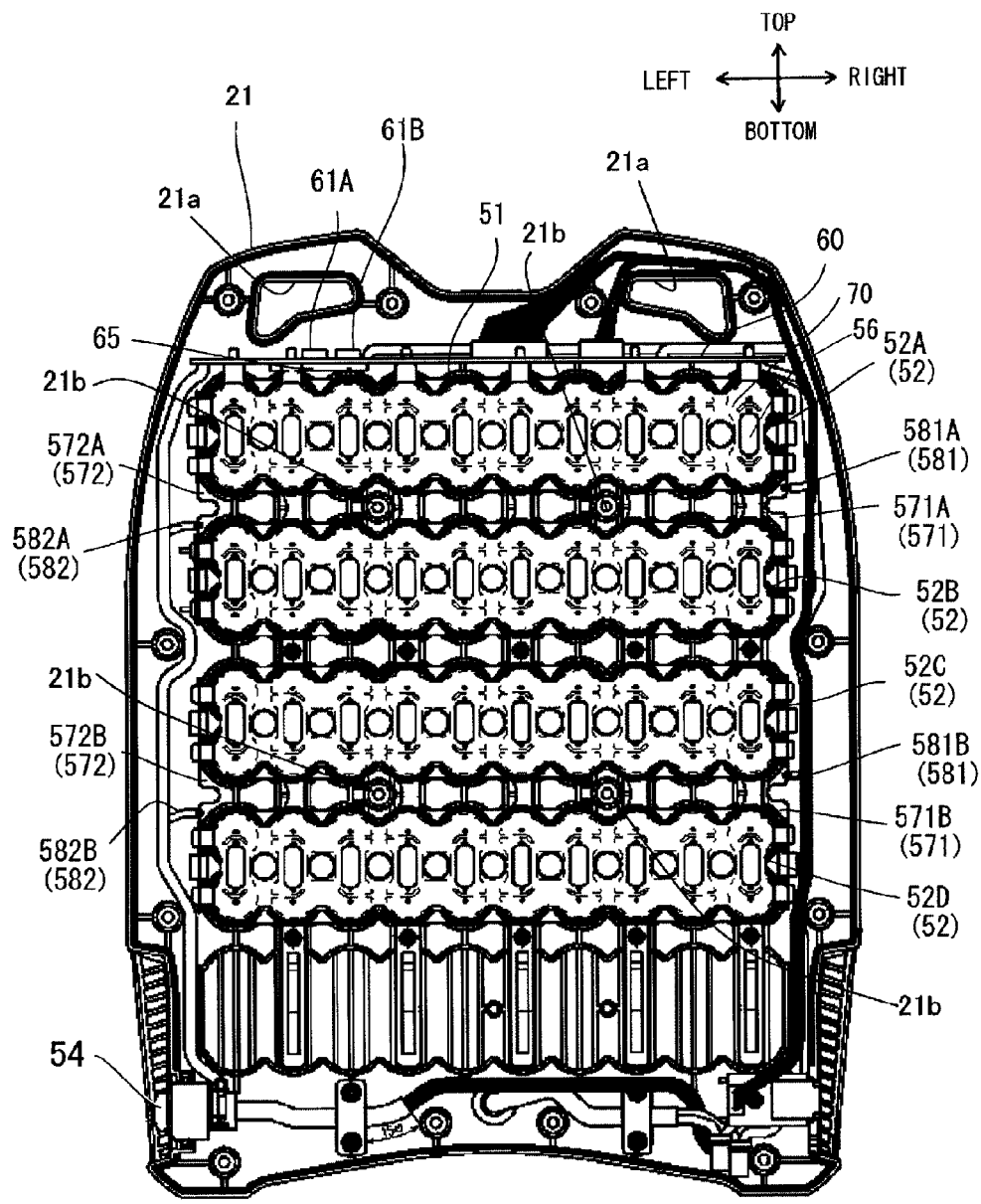
FIG. 3 is a cross-sectional plan view showing an internal configuration of the case of the backpack-type power supply according to the first embodiment.

In FIG. 3, the metal plates 56 (56A and 56B) are covered with a generally rectangular insulating plate 70. Specifically, the insulating plate 70 is formed with a plurality of apertures through which the metal plates 56 (56A and 56B) are exposed in each cell unit 52.

Figure 4:
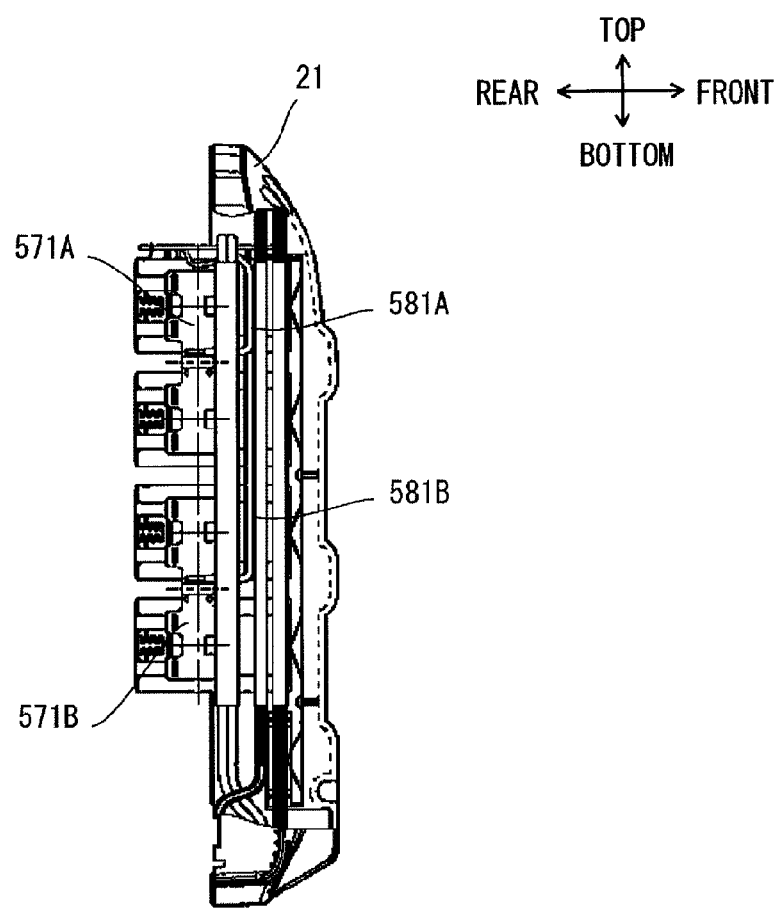
FIG. 4 is a cross-sectional side view (right side view) of the case of the backpack-type power supply according to the first embodiment.
Figure 5:
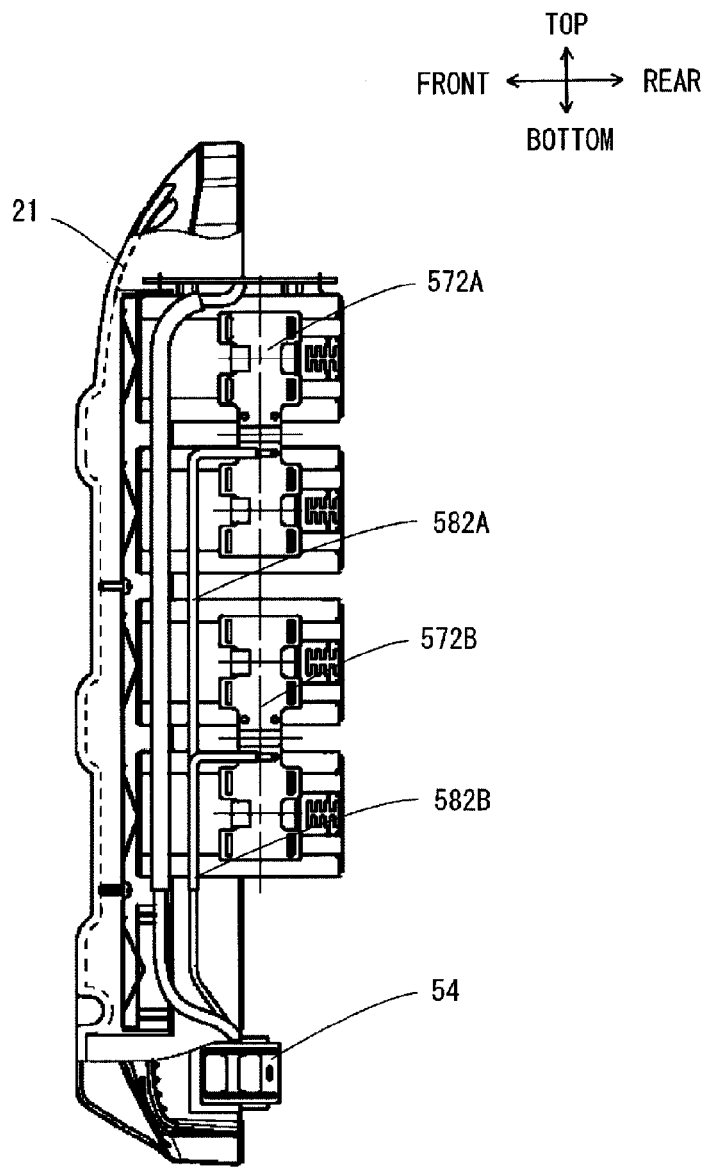
FIG. 5 is a cross-sectional side view (left side view) of the case of the backpack-type power supply according to the first embodiment.

As shown in FIGS. 3 and 4, two generally rectilinear metal plates 571 (metal plates 571A and 571B) and two lead wires 581 (lead wires 581A and 581B) are provided on the right ends of the cell units 52. Also, as shown in FIGS. 3 and 5, two generally rectilinear metal plates 572 (metal plates 572A and 572B) and two lead wires 582 (lead wires 582A and 582B) are provided on the left ends of the cell units 52. The two lead wires 581 are substantially equivalent in length, although the lead wires 581 do not seem to be equal to each other in length in FIGS. 3 and 4. Similarly, the two lead wires 582 are substantially equivalent in length, although the lead wires 582 do not seem to be equal to each other in length in FIGS. 3 and 5. Therefore, the two lead wires 581 have resistance values substantially equivalent to each other, and the two lead wires 582 have resistance values substantially equivalent to each other.

As shown in FIGS. 3 and 4, the metal plate 571A connects the positive terminals of the cell units 52A and 52B in parallel, and the metal plate 571B connects the positive terminals of the cell units 52C and 52D in parallel. One end of the lead wire 581A is connected to a vertical center region of the metal plate 571A, and one end of the lead wire 581B is connected to a vertical center region of the metal plate 571B. The other ends of the lead wires 581A and 581B are connected to a single terminal on the circuit board 60. With this arrangement, the metal plates 571A and 571B are connected in parallel.

Similarly, the metal plate 572A connects the negative terminals of the cell units 52A and 52B in parallel, and the metal plate 572B connects the negative terminals of the cell units 52C and 52D in parallel, as shown in FIGS. 3 and 5. Each end of the lead wires 582A and 582B is connected to a vertical center region of the metal plates 572A, 572B respectively, while the other ends of the lead wires 582A and 582B are connected to a single terminal of the main power switch 54. With this configuration, the metal plates 572A and 572B are connected in parallel. Consequently, the four cell units 52 are connected in parallel.

In the first embodiment, the metal plates 571 and 572 and the lead wires 581 and 582 are both configured to have substantially equivalent resistance values, so that the resistance between the two body-side connection points (the single terminal on the circuit board 60 to which the lead wires 581A and 581B are connected and the single terminal on the main power switch 54 to which the lead wires 582A and 582B are connected in the first embodiment) and each cell unit 52 (hereinafter called "wire resistance") and including the contact resistance at each point is equal among all cell units 52.

Here, "equivalent resistance values" does not necessitate that the difference in resistance values between connection points be strictly zero, provided that the difference is sufficiently less than the internal resistance of the battery cells 51 and cell units 52 to have substantially no effect on irregularities in temperature rises among battery cells 51. In the first embodiment, the battery cells 51 have an internal resistance of approximately 20 milliohm, as an example.

The first embodiment is not limited to the single example given above. The pairs of metal plates 571 and 572 and the lead wires 581 and 582 need not have the same resistance values, provided that the resistance values for paths from all cell units 52 to the body-side connection points (on the circuit board 60 and the like) are equivalent. When a shutdown element and/or a fuse or the like are provided on the paths, the combined resistance of the entire path including the shutdown element and the like should be equivalent for each cell unit 52. Common portions of paths shared by each cell unit 52, such as portions from the shutdown element to the circuit board 60 may share a single wire.

The backpack-type power supply 1 is a high-capacity power supply capable of outputting a large electric current. The first embodiment gives an example of each cell unit 52 outputting an electric current of approximately 5 A(ampere). Hence, it is a concern that such a large current will increase temperature variations among the cell units 52 as the amount of heat produced from the cell units 52 increases. Differences in wire resistances due to differences in the lengths of the wiring paths produce different output currents from the individual cell units, resulting in greater variation in the amount of heat generated in the cell units.

As a comparative example, the wire resistance among the four cell units 52 cannot be made equivalent when the positive terminals and negative terminals of the cell units 52 are respectively connected in parallel by single metal plates and the metal plates are connected, at either top or bottom end thereof, to the two body-side connection points. This configuration can produce a difference in wire resistance of as much as 200 milliohm between the cell unit 52 closest to the connection point and the cell unit 52 farthest from the connection point. As described above, the battery cells 51 configured of lithium-ion cells have a low internal resistance. The battery cells 51 used in the first embodiment have an internal resistance of approximately 20 milliohm.

Therefore, the contribution of wire resistance cannot be ignored in this type of large-current, low internal resistance system. In the comparative example, these differences in wire resistance can produce a temperature difference of approximately 10-20 degrees Celsius among the cell units 52. However, in the first embodiment, the metal plates 571 and 572 are each divided into two parts, and the four cell units 52 are connected in parallel by two lead wires 581 of equivalent length and two lead wires 582 of equivalent length. Consequently, each of the cell units 52 has the same wire resistance and, thus, outputs a current of the same magnitude. As a result, the amount of heat generated by each cell unit 52 can be made uniform.

In the first embodiment, the insulating sheet 65 is also provided on the bottom surface of the circuit board 60 (the surface confronting the cell unit 52A) in a position corresponding to the location of the FETs 61A and 61B provided on the top surface. Since the FETs 61A and 61B are the primary sources of heat in the circuit board 60, the insulating sheet 65 can prevent heat generated by the FETs 61A and 61B from transferring to the cell unit 52 side. Hence, this construction can prevent an increase in the temperature of the cell unit 52A adjacent to the FETs 61A and 61B, and more specifically the battery cells 51 disposed adjacent to the FETs 61A and 61B in the cell unit 52A.

Further, in the backpack-type power supply 1 according to the first embodiment, the battery cells 51 are arranged in the plurality of cell units 52. Thus, when only some of the battery cells 51 suffer from degradation, only the cell unit 52 possessing the degraded battery cells 51 need be replaced, rather than all of the battery cells 51 in the backpack-type power supply 1. Replacing secondary battery cells 51 by cell units 52 in this way facilitates maintenance and inspection of the backpack-type power supply 1 and reduces costs required for replacements.

Various modifications and variations can be conceivable.

While two each of the metal plates 571 and 572 are provided in the first embodiment described above, the number of metal plates 571 and 572 is not limited to two each. For example, it is possible to provide the same number of the metal plates 571 and 572 as the cell units 52. In the case of the first embodiment, four each of the metal plates 571 and 572 would be provided. One each of the metal plates 571 and 572 would be connected to a single corresponding cell unit 52, and four each of the lead wires 581 and 582 would be connected to the metal plates 571 and 572, respectively. Here, as in the first embodiment, each of the four lead wires 581 has the same length (resistance value), and each of the four lead wires 582 has the same length (resistance value).

Further, as in the comparative example described above, the cell units 52 may be connected by one each of the metal plates 571 and 572 (one common plate for all cell units 52). Here, one lead wire is connected to the bottom end of one of the metal plates, and one lead wire is connected to the top end of the other metal plate. In this case, the lengths of positive and negative paths differs for each cell unit 52, but the sum of path lengths on the positive and negative sides, i.e., the total wire resistance between the body-side connection points will be uniform for all cell units 52.

In the first embodiment described above, the circuit board 60 is provided on top of the cell unit 52A, but the circuit board 60 is not limited to this position. For example, the circuit board 60 may be disposed between the cell units 52B and 52C, i.e., in the middle of the four cell units 52. In this case, a thermal sheet may be provided to cover the top surfaces of the FETs 61A and 61B in addition to the thermal sheet provided on the bottom surface of the circuit board 60. This configuration allows the lead wires 581 connected between the metal plates 571 and the circuit board 60 to be shortened while being maintained at equal lengths. The vertical position of the main power switch 54 may also be adjusted closer to a position between the cell units 52B and 52C. This construction allows the lead wires 582 to be further shortened while being maintained at equal lengths. As an alternative to providing the circuit board 60 between the cell units 52B and 52C, the circuit board 60 may be provided between different cell units 52 or may be provided between the case 12 and the metal plates 56 with respect to the frontrear direction, with the metal plates 56 serving as battery tabs (electrodes) of the cell units 52. This configuration allows the lead wires 581 to be made shorter in length than when the circuit board 60 is provided on top of the cell unit 52A.

Alternatively, the circuit board 60 may be divided into a plurality of parts and arranged around the periphery of the cell units 52. For example, the circuit board 60 may be divided into two parts and disposed respectively on the front and rear sides of the cell units 52 (near and far sides in FIG. 2) or on the left and right sides, the top and bottom sides, or the like. These configurations can more uniformly distribute heat produced from the cell units 52 and heat generated from the FETs 61A and 61B. Here, the circuit board 60 may be divided into two or more parts.

In the first embodiment described above, heat produced from the cell units 52 is evenly distributed by using lead wires 581 and 582 of equal length and having a uniform wire resistance. However, as the number of cell units 52 and the number of battery cells 51 constituting each cell unit 52 are increased, increasing the density of the battery cells 51, the temperature of the battery cells 51 positioned in the denser, center region of the case 12 tends to be remarkably higher than the temperature of battery cells 51 positioned on the left-right and vertical sides. Further, the heat generated from each battery cell 51 tends to be greater in a vertically higher cell unit 52 (cell unit 52A, for example) than in a vertically lower cell unit 52 (cell unit 52D, for example) as the heat rises toward the top of the case 12. When a bias in temperature occurs among cell units 52 due to factors other than wire resistance, wire paths may be set at differing lengths to produce differing wire resistances in order to rectify this bias in temperature.

For example, if the temperature of the topmost cell unit 52A is higher than that of the other cell units 52 with wiring of equal lengths, the lead wires 581A and 582A connected to the upper metal plate 571A and 572A should be set longer than the lead wires 581B and 582B connected to the lower metal plates 571B and 572B. Through this configuration, the resistance in the lead wires 581A and 582A will be greater than that in the lead wires 581B and 582B, reducing the current flowing in the lead wires 581A and 582A. As a result, the heat generated by the upper cell units 52A and 52B and the lead wires 581A and 582A will be less than the heat generated by the lower cell units 52C and 52D and the lead wires 581B and 582B respectively.

In the variation described above using the four lead wires 581 and four lead wires 582, the wire resistance in the cell units 52 can similarly be reduced in sequence from the top cell unit 52A to the bottom cell unit 52D by setting the lengths of the lead wires 581 and 582 gradually shorter from top (the side connected to the cell unit 52A) to bottom. Further, rather than changing the lengths of the lead wires 581 and 582, the wire resistance can be modified by changing the wire material or by inserting separate elements for balancing resistance. Note that the cell units 52 susceptible to high-rising temperatures may change depending on the number of cell units 52 provided in the structure of the case 12. Therefore, the present invention is not limited to the lead wires 581 and 582 whose resistance values change sequentially from top to bottom. The resistance values of the lead wires 581 and 582 corresponding to the cell unit 52 that generates the most heat should be set relatively larger. For example, if the temperature in the centermost cell unit 52 rises higher than the temperature in the other cell units 52, then the resistance value for the wiring path used in the centermost cell unit 52 may be increased.

Further, in order to disperse heat generated from specific battery cells 51 or the circuit board 60 (the FETs 61A and 61B, etc.) to other battery cells 51 or through the entire cell unit 52, it is possible to cover the battery cells 51 or part or all of the cell units 52 with a heat radiation material, such as a thermally conductive sheet or other thermal diffusion member. This measure can mitigate an increase in heat in the battery cells 51 provided at positions susceptible to increases in temperature. Dispersing heat generated from the circuit board 60 and the like throughout the entire cell units 52 can produce a uniform temperature throughout the entire cell units 52. The thermal diffusion member is preferably arranged to cover at least a portion of the side surfaces of the battery cells 51 so as to encompass a set of the battery cells 51 or cell units 52, for example.

Further, the entire case 12 or at least a portion of the case 12 near the cell units 52 and the circuit board 60 may be constructed of a material having high thermal conductivity, such as metal, for transferring heat from the cell units 52 and the circuit board 60 to the case 12. Here, the cell units 52 and the circuit board 60 may be in direct contact with the case 12 or may contact the case 12 through the thermal diffusion member described above. Alternatively, a chassis formed of metal or another material with high thermal conductivity may be provided inside the case 12 so that heat from the cell units 52 is transferred to the chassis. In this case, the cell units 52 may contact the chassis directly or through the thermal diffusion member described above. Further, the cell units 52 and the like may contact the case 12, the chassis, or the like through an insulating member such as an insulating sheet or resin having a thickness that effectively does not interfere with heat transfer.

Figure 6:
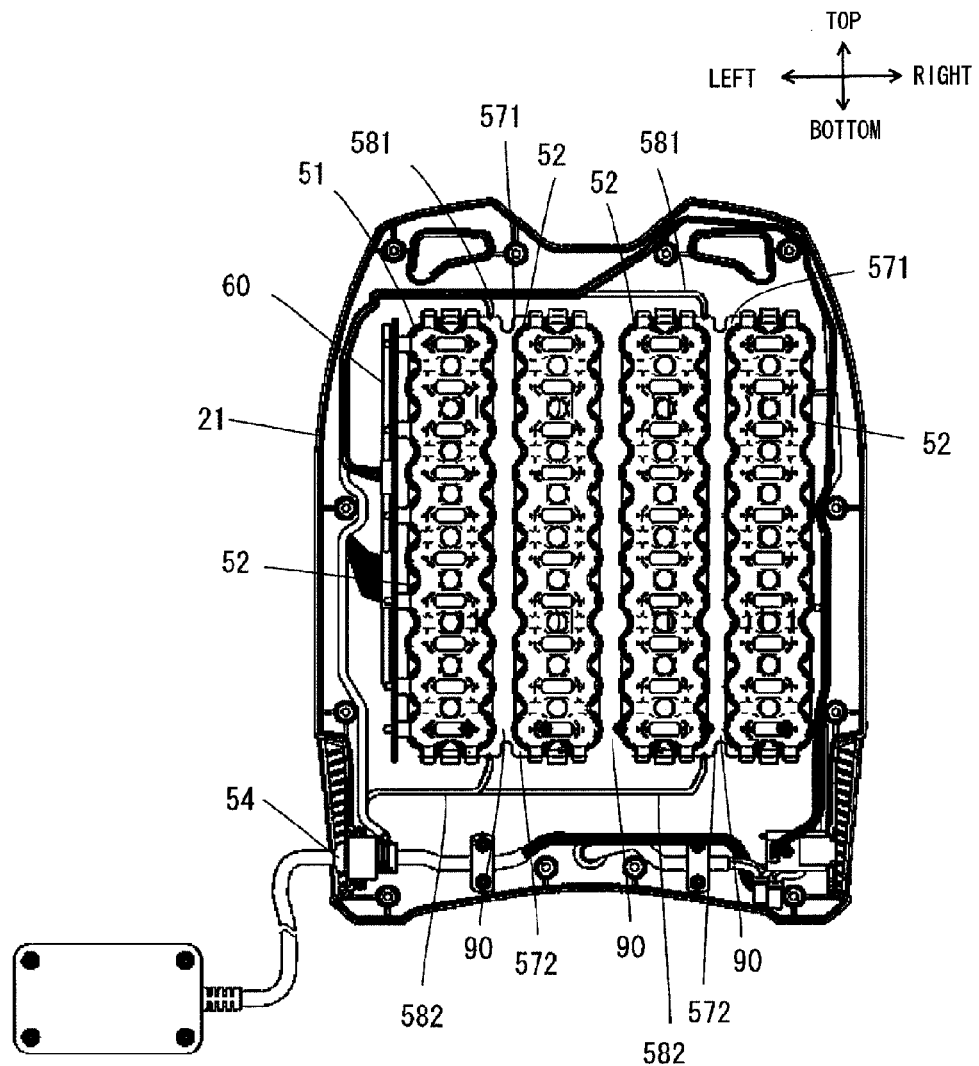
FIG. 6 is a cross-sectional plan view showing an internal configuration of a case of a backpack-type power supply according to a variation of the first embodiment.

As a further variation of the first embodiment, as illustrated in FIG. 6, the cell units 52 may be rotated 90 degrees from the arrangement of the first embodiment. In this arrangement, the cell units 52 are elongated vertically and juxtaposed in the left-right direction. In the example of FIG. 6, the circuit board 60 is provided on the left side of the leftmost cell unit 52. A space 90 is formed between each pair of neighboring cell units 52 and serves as a path for airflow. Air heated by the cell units 52 readily flows upward through the spaces 90, thereby dissipating heat generated from the cell units 52 and preventing particular cell units 52 from getting excessively hot. The circuit board 60 may be moved to the top or bottom ends or another desired position in this construction as in the first embodiment. Further, when employing the thermal diffusion member, the member is preferably disposed so as not to block the spaces 90.

Figure 7:
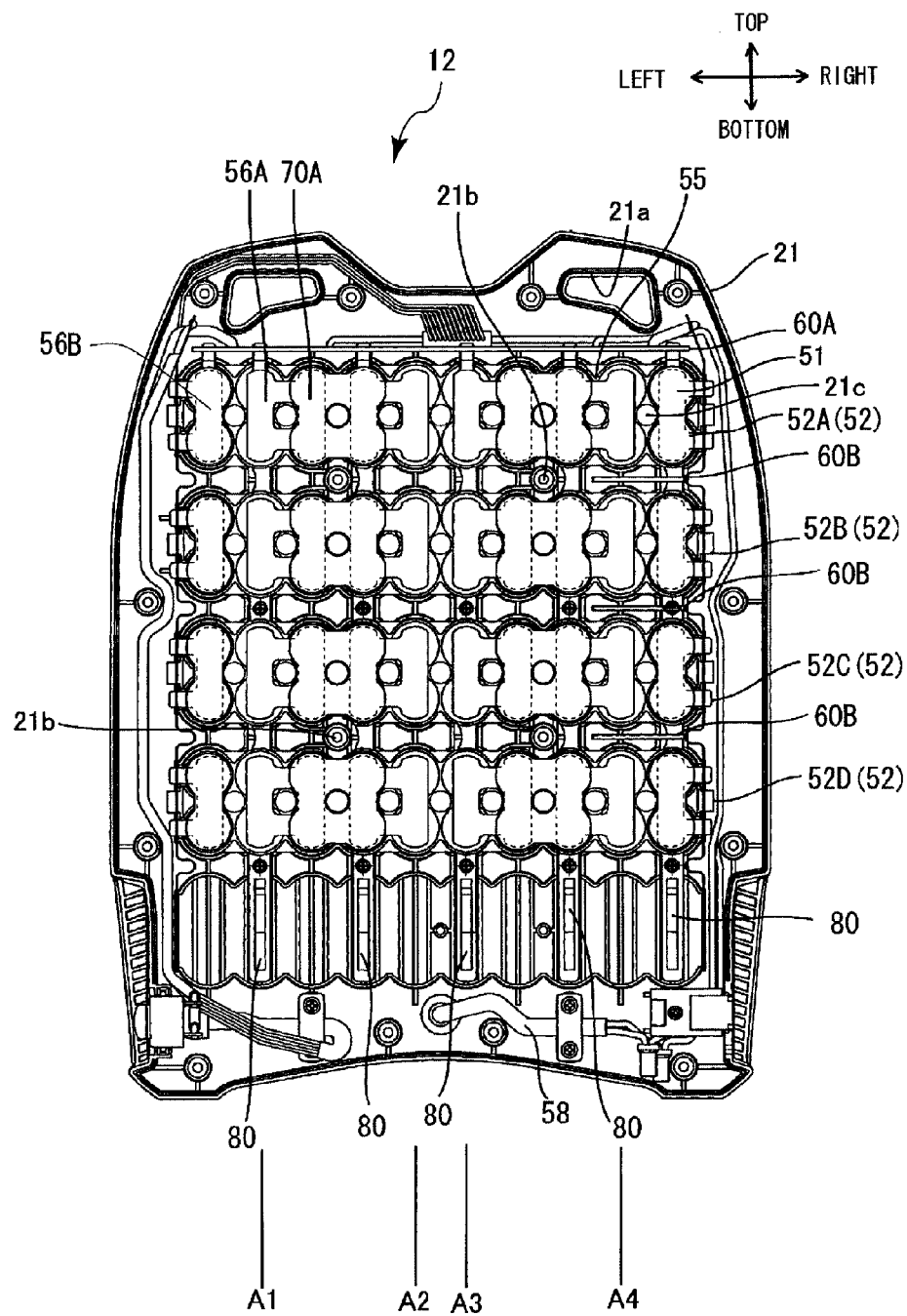
FIG. 7 is a cross-sectional plan view showing an internal configuration of a first section of a case of a backpack-type power supply according to a second embodiment of the present invention, the case having the first section and a second section to be coupled together.

FIGS. 7 and 8 depict another internal configuration of the case 12 according to a second embodiment of the present invention.

Each of the cell units 52 has a separator 55 serving as the outer frame. The twenty battery cells 51 are fixedly disposed in each separator 55. Each separator 55 has, on a bottom surface thereof, a recession that fits over a protrusion protruding inward from the inner surface of the first section 21. The separators 55 are positioned relative to the first section 21 by fitting the recessions over the protrusions. A position 21c in FIG. 6 indicates a gap between neighboring battery cells 51. One each of the protrusions and recessions described above are located in this gap.

Instead of the insulating plates 70 of the first embodiment, insulating sheets 70A are provided over the metal plates 56A so that each insulating sheet 70A overlaps two adjacent metal plates 56A. The insulating sheets 70A serve to lessen exposed areas of the battery tabs. Thus, the metal plates 56A are disposed between the battery cells 51 and the insulating sheets 70A and are fixed to the battery cells 51.

In the second embodiment, the circuit board 60 of the first embodiment is divided into a plurality of parts, more specifically, a main board 60A and three sub protection boards 60B. The main board 60A is mounted on the topmost separator 55. The main board 60A includes the overall control circuit for the backpack-type power supply 1 and a circuit for monitoring overdischarge and overcharge. The main board 60A is also provided with a protection circuit for monitoring the topmost cell unit 52. The sub protection boards 60B are provided above the right end of each of the cell units 52B-52D. Each sub protection board 60B has a protection circuit for monitoring the corresponding cell unit 52B-52D and is configured to send monitor and error signals to the main board 60A. By providing each of the cell units 52 with the main board 60A or the sub protection board 60B, the battery cells 51 can be monitored more carefully than when the single main board 60 is provided for all cell units 52 as in the first embodiment, thereby facilitating management of the battery cells 51.

Alternatively, a protection circuit provided on a single sub protection board 60B may be configured to monitor a plurality of cell units 52. Still alternatively, sub protection boards 60B may be provided just for those cell units 52 that require monitoring, rather than for all cell units 52.

An output line 58 for supplying power to the power tool 2A or 2B is connected on one end to the main board 60A, while the other end extends out through the bottom of the first section 21. In addition to outputting power, the output line 58 is used as a charging line when charging the battery cells 51 of the backpack-type power supply 1.

Further, five connection plates 80 are provided on an inner surface of the first section 21. The connection plates 80 extend vertically for connecting the four juxtaposedly-arranged cell units 52 in parallel.

Four connection plates 81 are also provided in a vertical orientation on an inner surface of the second section 22, as shown in FIG. 8. Together with the connection plates 80 provided in the first section 21, the connection plates 81 function to connect the plurality of cell units 52 in parallel. Each of the connection plates 80 and 81 is formed with a plurality of spring components (shown without reference numerals), which are configured to contact the metal plates 56A that fall along lines A1, A2, A3, and A4 in FIG. 7 when the second section 22 is fitted into the first section 21.

Dividing the connection plates 80, 81 among the two sections 21, 22 of the case 12 rather than providing all plates in one section eliminates the time and effort required to remove such connecting plates at the manufacturing stage or when replacing cell units 51, thereby greatly simplifying these tasks. Further, the electrical connections between the cell units 52 and the connecting plates 81 are interrupted when the second section 22 is separated from the first section 21 since the second section 22 does not accommodate the cell units 52 at this time. Accordingly, if a metal object such as a screwdriver contacts and short-circuits terminals of battery cells 51 while the case 12 is open for repair work or the like, the short-circuit affects the cell unit 52 to which the short-circuited secondary battery cells 51 belong, but has little effect on the other cell units 52. In other words, the cell units 52 are electrically disconnected from each other when the first section 21 and second section 22 are separated and function as a single large-capacity cell only when the first section 21 and second section 22 are combined.

It should be noted that, constructions corresponding to the connection plates 80, 81 of the second embodiment are also provided in the two sections 21, 22 of the case 12 of the first embodiment, respectively, although not described with respect to the first embodiment.

With this construction of the second embodiment, when only some of the battery cells 51 suffer from degradation, only the cell unit 52 possessing the degraded battery cells 51 need be replaced. Replacement of the battery cells 51 and cell units 52 can be performed with ease. Further, maintenance and inspection of the backpack-type power supply 1 can be thus facilitated and costs required for replacements can also be reduced, as in the first embodiment.

While the invention has been described in detail with reference to the embodiments thereof, it would be apparent to those skilled in the art that various changes and variations may be made therein without departing from the scope of the claims.

For example, while the cell units 52 are accommodated in the first section 21 in the depicted embodiments, the cell units 52 may be accommodated in the second section 22 while only connection plates 80 are provided in the first section 21.

REFERENCE SIGNS LIST

1: backpack-type power supply
12: case
13: harness
14: operating switch
21: first section
22: second section
31: padded part
32: shoulder strap
33: waist belt
34: top strapping system
38: handle
51: battery cells
52, 52A, 52B, 52C, 52D: cell unit
571, 571A, 571B: metal plate
572, 572A, 572B: metal plate
581, 581A, 581B: lead wire
582, 582A, 582B: lead wire
55: separator
56, 56A, 56B: metal plate (electrode)
58: output line
60: circuit board
60A: main board
60B: sub protection board
61A, 61B: FET
65: insulating sheet
70: insulating plate
70A: insulating sheet
80: connection plate
81: connection plate

The invention claimed is:

1. A backpack-type power supply comprising:
a plurality of cell units each configured of a plurality of secondary battery cells connected in series;
a case configured to accommodate the plurality of cell units therein, the case having a first contact and a second contact each electrically connected to each of the plurality of cell units;
a harness attached to the case and adapted to be worn on a user's back;
a first connector configured to electrically connect the first contact and a positive terminal of each cell unit to form a first electrical path therebetween, each first electrical path having a first resistance; and
a second connector configured to electrically connect the second contact and a negative terminal of each cell unit to form a second electrical path therebetween, each second electrical path having a second resistance, each first electrical path and each second electrical path forming a total electrical path for each of the cell units, the total electrical path for each cell unit having a total resistance, the total resistance of each total electrical path being adjusted such that heat distribution is substantially uniform over the plurality of cell units in the case.

2. The backpack-type power supply according to claim 1, wherein the total resistance of each total electrical path is substantially equal to each other over the plurality of cell units.

3. The backpack-type power supply according to claim 2, wherein the first resistance is substantially equal to each other among the plurality of cell units, and the second resistance is substantially equal to each other among the plurality of cell units.

4. The backpack-type power supply according to claim 3, wherein the first connector comprises a plurality of first electrically conductive plates and a plurality of first lead wires configured to connect each of the plurality of cell units in parallel, the first electrically conductive plates having a shape identical to one another and the first lead wires having a length equal to each other, and
wherein the second connector comprises a plurality of second electrically conductive plates and a plurality of second lead wires configured to connect each of the plurality of cell units in parallel, the second electrically conductive plates having a shape identical to one another and the second lead wires having a length equal to each other.

5. The backpack-type power supply according to claim 1, further comprising:
a circuit board configured to monitor overdischarging and overcharging in the plurality of cell units, and
an output line connectable to a power tool and configured to supply power from the cell units to the connected power tool, the circuit board serving as the first contact of the case and the output line serving as the second contact of the case.

6. The backpack-type power supply according to claim 5, wherein the circuit board further comprises a switching element configured to perform switching supply and shutdown of power from the cell units, the circuit board being disposed adjacent to one of the plurality of cell units,
the backpack-type power supply further comprising a heat insulating member positioned between the switching element and the one cell unit to prevent heat from transmitting to the one cell unit.

7. The backpack-type power supply according to claim 5, wherein the plurality of cell units comprises a first cell unit and a second cell unit, the circuit board being disposed between the first cell unit and the second cell unit.

8. The backpack-type power supply according to claim 5, wherein the circuit board comprises two circuit boards, each of the two circuit boards being disposed to surround the plurality of cell units.

9. The backpack-type power supply according to claim 5, wherein the circuit board comprises a plurality of protective circuit boards each disposed for each of the plurality of cell units.

10. The backpack-type power supply according to claim 1, wherein each of the first electrical paths and each of the second electrical paths include at least one of a switching element and a fuse for shutting down the corresponding electrical path.

11. The backpack-type power supply according to claim 1, wherein the plurality of cell units comprises a first cell unit and a second cell unit, the first cell unit being disposed upward of the second cell unit, wherein the total resistance of the total electrical path for the first cell unit is larger than the total resistance of the total electrical path for the second cell unit.

12. The backpack-type power supply according to claim 1, wherein the plurality of cell units comprises a first cell unit, a second cell unit and a third cell unit juxtaposed in a first direction, the second cell unit being disposed between the first and third cell units in the first direction, wherein the total resistance of the total electrical path for the second cell unit is larger than the total resistance of the total electrical path for the first cell unit and larger than the total resistance of the total electrical path for the third cell unit.

13. The backpack-type power supply according to claim 1, further comprising a thermal diffusion member configured to disperse heat among the cell units, the thermal diffusion member being disposed to cover at least a portion of the cell units.

14. The backpack-type power supply according to claim 13, wherein the thermal diffusion member is a thermally conductive sheet.

15. The backpack-type power supply according to claim 1, wherein the case has a heat conductive portion that is made of a material having a thermal conductivity higher than a thermal conductivity of the harness, heat generated from the plurality of cell units being configured to be transferred to the heat conductive portion.

16. The backpack-type power supply according to claim 1, wherein the case comprises a first section configured to oppose the user's back and a second section coupled to the first section, the plurality of cell units being accommodated in one of the first section and the second section.

17. The backpack-type power supply according to claim 16, wherein the first section is provided with a plurality of first connecting plates electrically connectable to the plurality of cell units and the second section is provided with a plurality of second connecting plates electrically connectable to the plurality of cell units, the plurality of cell units being electrically connected to one another via the first connecting plates and the second connecting plates when the first section and the second section are coupled to each other.

18. The backpack-type power supply according to claim 17, wherein the plurality of cell units is electrically connected in parallel via the first connecting plates and the second connecting plates when the first section and the second section are coupled to each other.

* * * * *